United States Patent
Ogata et al.

(10) Patent No.: US 9,665,188 B2
(45) Date of Patent: May 30, 2017

(54) POSITION INDICATOR

(71) Applicant: Wacom Co., Ltd., Saitama (JP)

(72) Inventors: Mamoru Ogata, Saitama (JP); Osamu Nagase, Kanagawa (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 14/792,918

(22) Filed: Jul. 7, 2015

(65) Prior Publication Data

US 2016/0062490 A1    Mar. 3, 2016

(30) Foreign Application Priority Data

Sep. 2, 2014    (JP) .................................. 2014-178395

(51) Int. Cl.
- *G06F 3/0354*    (2013.01)
- *G06F 3/038*    (2013.01)
- *G06F 3/041*    (2006.01)

(52) U.S. Cl.
CPC .......... *G06F 3/03545* (2013.01); *G06F 3/038* (2013.01); *G06F 3/0414* (2013.01); *G06F 2203/0381* (2013.01)

(58) Field of Classification Search
CPC .... G06F 3/03545; G06F 3/0414; G06F 3/038; G06F 2203/0381; G06F 3/044
See application file for complete search history.

(56) References Cited

U.S. PATENT DOCUMENTS

| | | |
|---|---|---|
| 8,199,132 B1 | 6/2012 | Oda et al. |
| 8,913,041 B2 | 12/2014 | Fukushima et al. |
| 2011/0219892 A1* | 9/2011 | Fukushima ......... G06F 3/03545 73/865.4 |
| 2012/0146958 A1 | 6/2012 | Oda et al. |

(Continued)

FOREIGN PATENT DOCUMENTS

| | | |
|---|---|---|
| EP | 2 365 424 A2 | 2/2011 |
| EP | 2 466 431 A1 | 3/2011 |

(Continued)

OTHER PUBLICATIONS

Extended European Search Report dated Feb. 1, 2016 for corresponding EP Application No. 15179263.7-1972, 8 pages.

*Primary Examiner* — Nalini Mummalaneni
*Assistant Examiner* — Ivelisse Martinez Quiles
(74) *Attorney, Agent, or Firm* — Seed IP Law Group LLP

(57) ABSTRACT

A position indicator includes a first electrode receiving an alternating current (AC) signal from a position detecting sensor and a second electrode transmitting an AC signal to the position detecting sensor. The position indicator includes: a tubular pen-shaped chassis; a central electrode provided such that one end protrudes outside of the chassis from an opening of the chassis, and formed of an electrically-conductive member forming a first one of the first and second electrodes; a peripheral electrode surrounding the central electrode and formed of an electrically-conductive member forming a second one of the first and second electrodes; and a shield member having a hollow part (Continued)

housing at least a part of the central electrode surrounded by the peripheral electrode. The shield member includes a tubular part electrically connected to ground and an insulating layer formed on an inner wall surface and an outer wall surface of the tubular part.

11 Claims, 10 Drawing Sheets

(56) References Cited

U.S. PATENT DOCUMENTS

| | | | | |
|---|---|---|---|---|
| 2013/0199311 A1* | 8/2013 | Horie | ............ | G06F 3/03545 73/862.626 |
| 2015/0309598 A1* | 10/2015 | Zeliff | ............ | G06F 3/03545 345/179 |
| 2015/0363012 A1* | 12/2015 | Sundara-Rajan | ... | G06F 3/03545 345/179 |

FOREIGN PATENT DOCUMENTS

| | | | |
|---|---|---|---|
| JP | 2839804 | B2 | 12/1998 |
| JP | 4683505 | B1 | 5/2011 |
| JP | 2011186803 | A | 9/2011 |
| JP | 2013161307 | A | 8/2013 |
| WO | 2014/127383 | A2 | 8/2014 |

* cited by examiner

SECTIONAL VIEW ALONG LINE A-A

POSITION INDICATOR

BACKGROUND OF THE INVENTION

1. Field of the Invention

This disclosure relates to a position indicator used with a position detecting sensor.

2. Description of the Related Art

The following position indicator has been provided as a position indicator used with a position detecting sensor in which position detection is performed. Specifically, the position indicator has a configuration of so-called full-duplex communication, in which a signal input channel and a signal output channel independently exist, and thereby has a high affinity with the position detecting sensor. Furthermore, the position indicator has high general versatility and can ensure predetermined waveform correlativity between an input signal and an output signal (refer to Japanese Patent No. 4683505 (Patent Document 1)).

FIG. 10 is a diagram for explaining the conceptual configuration of a position indicator 301 of this Patent Document 1 and the processing operation thereof in a generalizing manner and shows a state in which the position indicator 301 is located over a plate surface of a capacitive position detecting sensor 302.

In the position indicator 301, a signal processing circuit 304 and a battery 305 that provides a supply voltage to the signal processing circuit 304 are housed in a hollow part of a tubular chassis 303 that has an opening on one end in the axial center direction and is formed into a pen shape. The chassis 303 is formed by covering at least a part which an operator holds this position indicator in the outer circumferential surface of a tubular body formed of, e.g., an insulating material such as a synthetic resin by, e.g., an electrical conductor such as a metal.

As shown in a partially enlarged view of FIG. 11, the opening side of the chassis 303 of this position indicator 301 is formed as a tapered part 303a that gradually becomes thinner toward the tip, and a peripheral electrode 306 that is formed into a ring shape and is formed of a metal having electrical conductivity is attached to the outer circumferential side of the tapered part 303a. Furthermore, a central electrode 307 is housed in the hollow part of the chassis 303 of the position indicator 301 in a state in which a tip part 307a of the central electrode 307 protrudes from the opening to the outside as shown in FIG. 11. The tip of the central electrode 307 is covered by an elastic protective member 307b formed of electrically-conductive elastic rubber or the like so that an indication input surface of the position detecting sensor 302 may be prevented from being scratched and a contact area with the indication input surface may be made larger.

In this case, in the direction orthogonal to the axial center direction of the position indicator 301, the tapered part 303a of the chassis 303 intervenes between the peripheral electrode 306 and the central electrode 307. The peripheral electrode 306 and the central electrode 307 are insulated from each other by this tapered part 303a of the chassis 303. Moreover, in the direction orthogonal to the axial center direction of the position indicator 301, a shield member 308 for effectively preventing electrical interference between the peripheral electrode 306 and the central electrode 307 is provided between the peripheral electrode 306 and the central electrode 307. The shield member 308 is formed of a tubular conductor composed of an electrically-conductive metal 308a having an insulating layer 308b formed on the inner wall surface, and the central electrode 307 is housed in this tubular conductor. Therefore, the central electrode 307 is configured to be surrounded by the shield member 308 and the shield member is connected to the ground (earth: the same hereinafter) to make a capacitive shield.

When this position indicator 301 is disposed over the position detecting sensor 302, as shown in FIG. 10, the peripheral electrode 306 is coupled to the position detecting sensor 302 via capacitance C1 and the central electrode 307 is also coupled to the position detecting sensor 302 via capacitance C2.

Meanwhile, an alternating current (AC) signal flows in the position detecting sensor 302 and thus this AC signal is supplied as a current signal to the signal processing circuit 304 via the capacitance C1 and the peripheral electrode 306. This signal processing circuit 304 executes processing of intensifying a signal, such as amplifying an input AC signal, and supplies an AC signal that is an output signal of the signal processing result to the central electrode 307. When the position indicator 301 exists over the position detecting sensor 302, the central electrode 307 is coupled to the position detecting sensor 302 via the capacitance C2 and thus the AC signal is returned from the position indicator 301 to the position detecting sensor 302.

Because the intensified AC signal is returned from the position indicator 301 to the position detecting sensor 302 in the above manner, the position detecting sensor 302 can detect the position indicated by the position indicator 301 with high sensitivity.

In this case, when the voltage of the AC signal of the position detecting sensor 302 in the transmitting conductor is defined as V and the voltage of the central electrode 307 of the position indicator 301 is defined as e and capacitance between the peripheral electrode 306 and the central electrode 307 is defined as C3 (see FIG. 10), a relationship of $$e \leq C1/C3 \cdot V$$

is satisfied. Therefore, to increase the voltage e of the central electrode 307, it is advantageous that the capacitance C3 between the peripheral electrode 306 and the central electrode 307 is as low as possible.

In the position indicator 301, the capacitance C3 between the peripheral electrode 306 and the central electrode 307 is made low by interposing the shield member 308 between the peripheral electrode 306 and the central electrode 307 to make the coupling between them as small as possible. This can increase the voltage e and efficiently enhance the sensitivity.

As described in Patent Document 1, it is also possible for the position indicator 301 to be configured to receive the AC signal from the position detecting sensor 302 by the central electrode 307 and transmit the AC signal resulting from the signal intensification by the signal processing circuit 304 from the peripheral electrode 306.

Recently, along with an increase in the preciseness of the indicated position in the position detecting sensor, demands for reduction in the thickness of the core body (central electrode) of the position indicator and hence for reduction in the thickness of the position indicator are increasing.

However, in the position indicator 301 of the above-described Patent Document 1, an insulating part (tapered part 303a of the chassis 303), a shield part (shield member 308), and an insulating part (insulating layer 308a) need to be provided between the central electrode 307 and the peripheral electrode 306 and it is difficult to satisfy the demands for the thickness reduction.

Furthermore, if a writing pressure being applied to the position indicator can be detected in the position detecting sensor, e.g., processing of changing the line width in line drawing by a user with use of the position indicator according to the writing pressure can be executed, which is convenient. Therefore, it is desirable for the position indicator to be configured to include a writing pressure detecting measure that detects the writing pressure applied to the core body (central electrode) and transmit writing pressure information detected by this writing pressure detecting measure to the position detecting sensor.

To detect the writing pressure by such a writing pressure detecting measure, the writing pressure applied to the core body (central electrode) of the position indicator needs to be transmitted to the writing pressure detecting measure. For this purpose, a configuration for allowing the core body (central electrode) of the position indicator to move in the axial center direction of the position indicator and surely transmitting the writing pressure is necessary.

In this case, the position indicator needs to have a configuration to ensure a predetermined thickness as the thickness of the core body in order to surely transmit the writing pressure and allow the central electrode to move in the axial center direction of the position indicator while having a structure to make the coupling between the peripheral electrode 306 and the central electrode 307 as small as possible. Thus, it is more difficult to employ the configuration designed in consideration of thickness reduction.

SUMMARY OF THE INVENTION

An object of this disclosure is to provide a position indicator that can solve the above problems.

To solve the above-described problems, in this disclosure, a position indicator is provided that includes a first electrode receiving an AC signal from a position detecting sensor and a second electrode transmitting an AC signal to the position detecting sensor and makes position indication to the position detecting sensor. The position indicator includes a tubular chassis that is formed into a pen shape and has an opening on one end in an axial center direction, a central electrode that is provided in the chassis such that one end protrudes from the opening of the chassis to an outside, and is formed of a bar-shaped electrically-conductive member forming one of the first electrode and the second electrode, a peripheral electrode that is provided to surround the central electrode on a side of the opening and is formed of an electrically-conductive member forming another of the first electrode and the second electrode, and a shield member that is provided between the central electrode and the peripheral electrode and has a tubular part that is formed of an electrically-conductive member and has a hollow part housing at least a part surrounded by the peripheral electrode in the central electrode, wherein the shield member includes an insulating layer formed on an inner wall surface and an outer wall surface of the tubular part corresponding to the part surrounded by the peripheral electrode in the central electrode, and the tubular part is electrically connected to the ground.

In the position indicator according to this disclosure with the above-described configuration, in the direction orthogonal to the axial center direction, the insulating layer is formed at least on the inner wall surface and the outer wall surface of the tubular part formed of the electrically-conductive member corresponding to the part surrounded by the peripheral electrode in the central electrode is interposed between the central electrode and the peripheral electrode.

By this shield member, the insulation and shield (mainly capacitive shield) between the central electrode and the peripheral electrode are realized.

Therefore, in the position indicator according to this disclosure, the configuration can be made in which only the shield member includes the insulating layer formed on the inner wall surface and the outer wall surface is disposed between the central electrode and the peripheral electrode. Thus, thickness reduction of the position indicator can be easily realized.

Furthermore, in this disclosure, it is more preferable to employ a configuration in which the tubular part of the shield member is composed of aluminum and the insulating layer is formed at least on the inner wall surface and the outer wall surface corresponding to the part surrounded by the peripheral electrode in the central electrode by performing alumite processing on the aluminum.

According to this disclosure, it is possible to make the configuration in which only the shield member including the insulating layer formed at least on the inner wall surface and the outer wall surface corresponding to the part surrounded by the peripheral electrode in the central electrode is disposed between the central electrode and the peripheral electrode. Thus, thickness reduction of the position indicator can be easily realized.

DETAILED DESCRIPTION OF THE PREFERRED EMBODIMENTS

An embodiment of the position indicator according to this disclosure will be described below with reference to the drawings.

Figure 1:
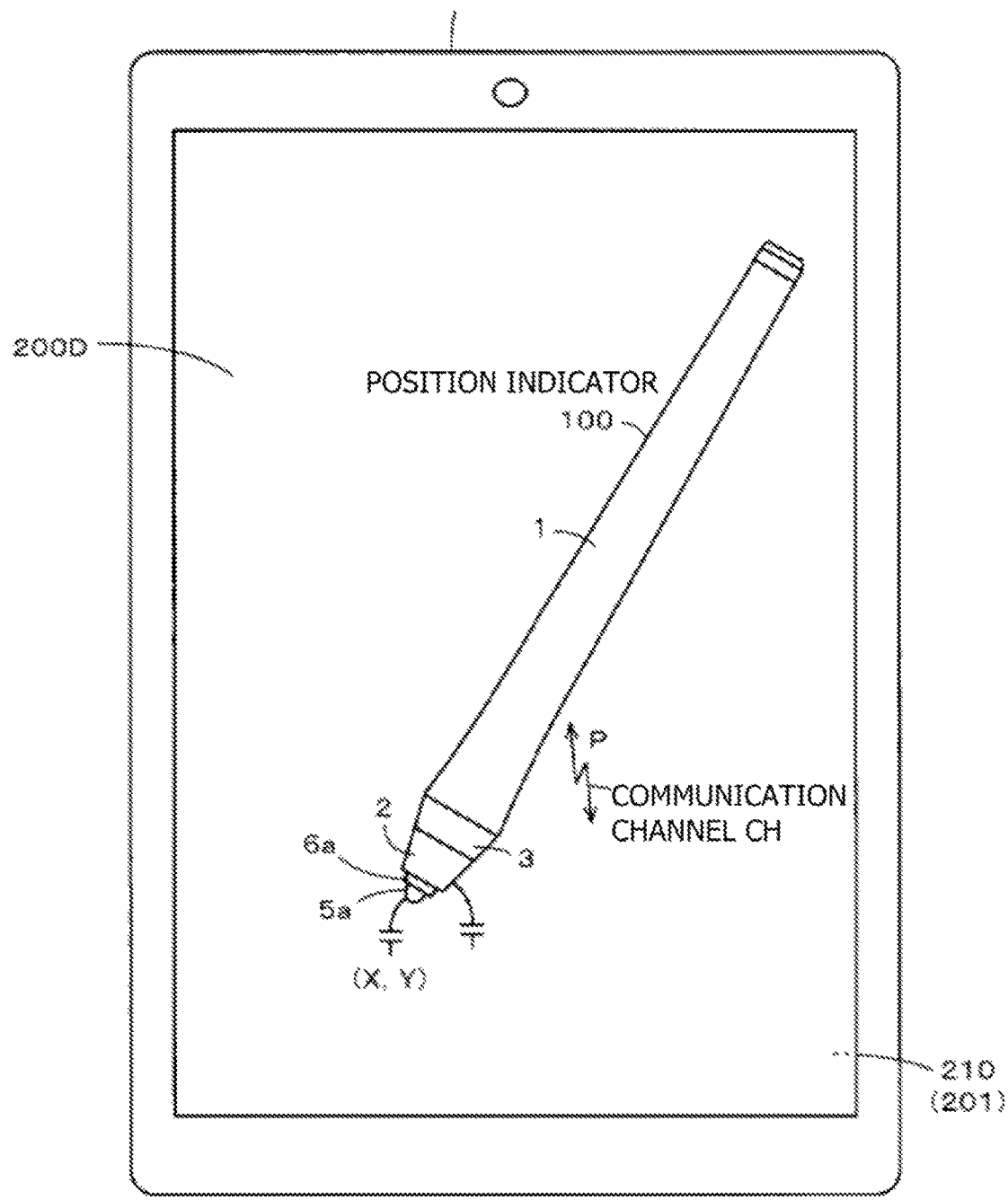
FIG. 1 is a diagram of an example of an electronic apparatus with which a position indicator according to an embodiment of this disclosure is used.

FIG. 1 shows one example of a tablet information terminal 200 as an example of an electronic apparatus with which a position indicator 100 according to an embodiment of this disclosure is used. In this example, the tablet information terminal 200 has a display screen 200D of a display device such as a liquid crystal display (LCD) and has a capacitive position detecting sensor 201 over the display screen 200D (on the front surface side).

[Configuration Example of Position Detecting Sensor 201]

The capacitive position detecting sensor 201 of this example is a mutual capacitive position detecting sensor that has sensor electrodes composed of an input electrode and an output electrode and that detects a change in a coupling capacitance at a point touched by the position indicator 100 as described below.

Figure 2:
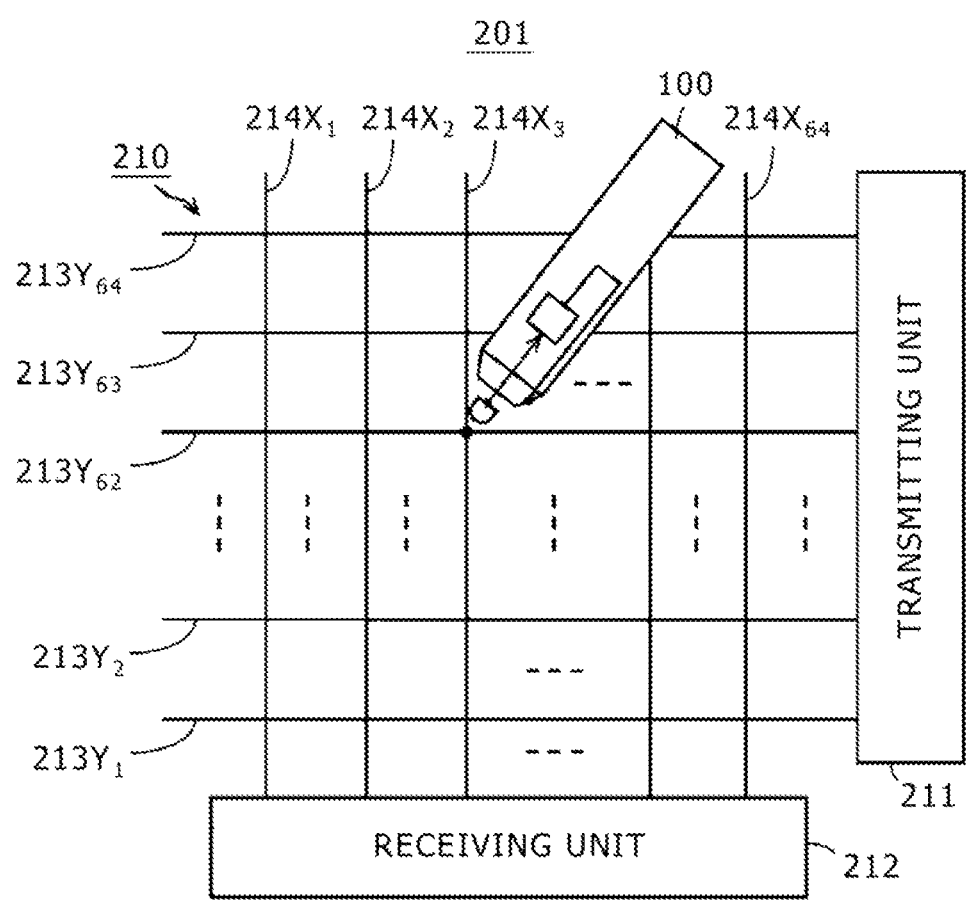
FIG. 2 is a diagram showing a configuration example of a position detecting sensor used with a position indicator according to an embodiment of this disclosure.

The capacitive position detecting sensor 201 of this example will be described with reference to FIG. 2. Specifically, as shown in FIG. 2, the position detecting sensor 201 of this example is composed of a sensor unit 210, a transmitting unit 211, and a receiving unit 212. The sensor unit 210 includes plural, in this example 64, transmitting conductors $213Y_1, 213Y_2, \ldots, 213Y_{64}$ that extend along the horizontal direction of the indication input surface (X-axis direction) and have a straight line shape and plural, in this example 64, receiving conductors $214X_1, 214X_2, \ldots, 214X_{64}$ that are orthogonal to the transmitting conductors $213Y_1$ to $213Y_{64}$ and extend along the vertical direction of the indication input surface (Y-axis direction). The plural transmitting conductors $213Y_1$ to $213Y_{64}$ are disposed at equal intervals in the Y-axis direction and are connected to the transmitting unit 211. The plural receiving conductors $214X_1$ to $214X_{64}$ are disposed at equal intervals in the X-axis direction and are connected to the receiving unit 212.

In this specification, in a description of the transmitting conductors, they will be referred to as the transmitting conductors 213Y when there is no need to discriminate them among the 64 transmitting conductors $213Y_1$ to $213Y_{64}$. Similarly, in a description of the receiving conductors, they will be referred to as the receiving conductors 214X when there is no need to discriminate them among the 64 receiving conductors $214X_1$ to $214X_{64}$.

The plural transmitting conductors 213Y are formed on the lower surface of a substrate for example. The plural receiving conductors 214X are formed on the upper surface of the substrate. Therefore, the plural transmitting conductors 213Y and the plural receiving conductors 214X have a placement relationship in which they are disposed opposed to each other at a predetermined interval and are orthogonal to each other, and form plural intersections (cross-points). Furthermore, the transmitting conductor 213Y and the receiving conductor 214X are coupled to each other via a predetermined capacitance at each cross-point.

The transmitting unit 211 supplies a predetermined AC signal to the transmitting conductors 213Y. In this case, the transmitting unit 211 may supply the same AC signal to the plural transmitting conductors $213Y_1, 213Y_2, \ldots, 213Y_{64}$ while sequentially switching the transmitting conductor one by one. Alternatively, the transmitting unit 211 may simultaneously supply plural AC signals different from each other to the plural transmitting conductors $213Y_1, 213Y_2, \ldots, 213Y_{64}$. Alternatively, the plural transmitting conductors $213Y_1, 213Y_2, \ldots, 213Y_{64}$ may be divided into plural groups and AC signals different on each group basis may be used.

The receiving unit 212 detects a signal component obtained by transmission of the AC signal supplied to the transmitting conductor 213Y to each of the receiving conductors $214X_1, 214X_2, \ldots, 214X_{64}$ via the predetermined capacitance. If the coupling capacitance between the transmitting conductor 213Y and the receiving conductor 214X is equal at all cross-points, a received signal at a predetermined level is detected in the receiving unit 212 from all receiving conductors $214X_1, 214X_2, \ldots, 214X_{64}$ in the sensor unit 210 when the position indicator 100 is not disposed over the sensor unit 210.

On the other hand, when the position indicator 100 makes contact with the sensor unit 210, the transmitting conductor 213Y and the receiving conductor 214X configuring the cross-point at the contact position and the position indicator 100 are coupled to each other via capacitance. That is, the capacitance changes due to the position indicator 100, so that the received signal level obtained from the receiving conductor 214X of the cross-point at which the position indicator 100 exists changes compared with the received signal level of the other cross-points.

The receiving unit 212 detects the receiving conductor 214X in which the change in the signal level of the received signal is caused among the plural receiving conductors $214X_1, 214X_2, \ldots, 214X_{64}$ to detect the position of the position indicator 100. Then, a control unit (not shown) of the position detecting sensor 201 detects the cross-point with which the position indicator 100 is in contact by detecting the transmitting conductor 213Y to which the AC signal is being supplied from the transmitting unit 211 and the receiving conductor 214X from which the change in the signal level of the received signal is detected in the receiving unit 212.

Also, when not the position indicator 100 but a finger gets close to or makes contact with the sensor unit 210, the position detecting sensor 201 can detect the cross-point the finger gets close to or contact with. In this case, part of the AC signal supplied to the transmitting conductor 213Y flows to the ground via the finger or the human body of the user and thus the signal level of the received signal of the receiving conductor 214X configuring the cross-point at which the finger exists changes. Therefore, by detecting this change in the signal level of the received signal, the receiving unit 212 can detect the receiving conductor 214X configuring the cross-point at which the finger exists.

Also, in the case of the position indicator 100 having a pen shape (stylus shape), the position detecting sensor 201 can detect the indicated position in the sensor unit 210 similarly to the principle of the position detection of the finger. However, in the case of the position indicator 100 having a pen shape, the contact area with the position detecting sensor 201 is smaller than in the case of the finger. Thus, the coupling capacitance is lower and the detection sensitivity of the position detection in the position detecting sensor 201 is lower.

However, in the case of the position indicator 100 of this embodiment, the AC signal from the position detecting sensor 201 is received and processed by the signal processing circuit to intensify the signal and then the resulting signal is returned to the position detecting sensor 201 as described above. This enables the position detecting sensor 201 to detect a contact position of the position indicator 100 with high sensitivity.

[Configuration Example of Position Indicator 100 of Embodiment]

<Outline of Configuration Example of Position Indicator 100>

An overview of the position indicator 100 according to an embodiment will be described with reference to FIGS. 3 and 4. This position indicator 100 includes a tubular chassis 1 composed of an electrically-conductive material, specifically, e.g., steel special use stainless (SUS). At an opening of this chassis 1 on one end on a pen tip side of the pen shape thereof, a peripheral electrode 2 composed of an electrically-conductive material, specifically, e.g., SUS, is provided with the intermediary of an insulating sleeve 3. The insulating sleeve 3 is to insulate the electrically-conductive chassis 1 from the peripheral electrode 2 and is composed of, e.g., an insulating resin.

Figure 4:
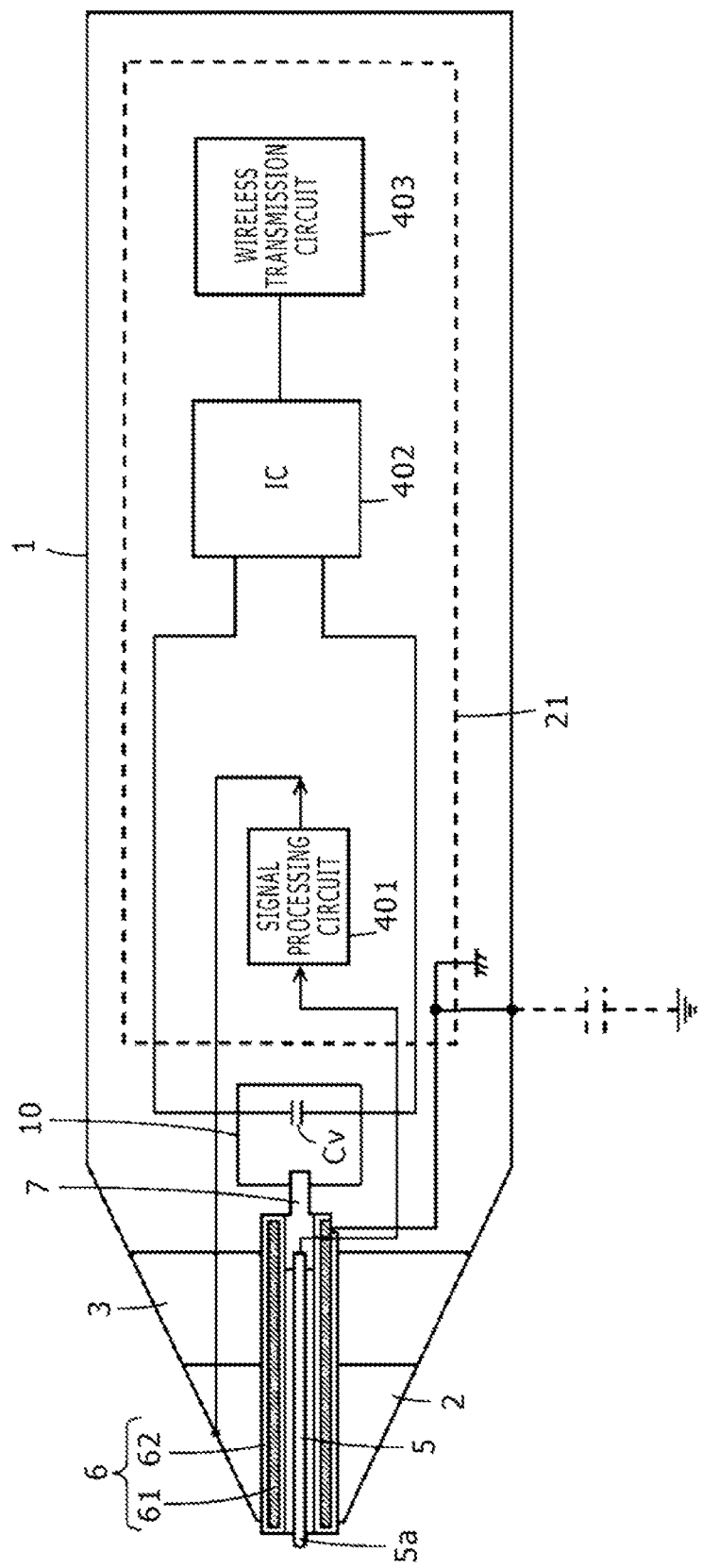
FIG. 4 is a circuit diagram of a position indicator according to an embodiment of this disclosure.

As shown in FIG. 4, inside the one end on the pen tip side of the chassis 1, a central electrode 5 is disposed in a state of being housed in a shield member 6. The shield member 6 is to shield the central electrode 5 and ensure insulation between the central electrode 5 and the peripheral electrode 2. In this case, from the opening at one end part on the pen tip side of the chassis 1, a tip part 5a of the central electrode 5 protrudes to the outside and a tip part 6a of the shield member 6 is exposed to the outside for example.

Figure 3:
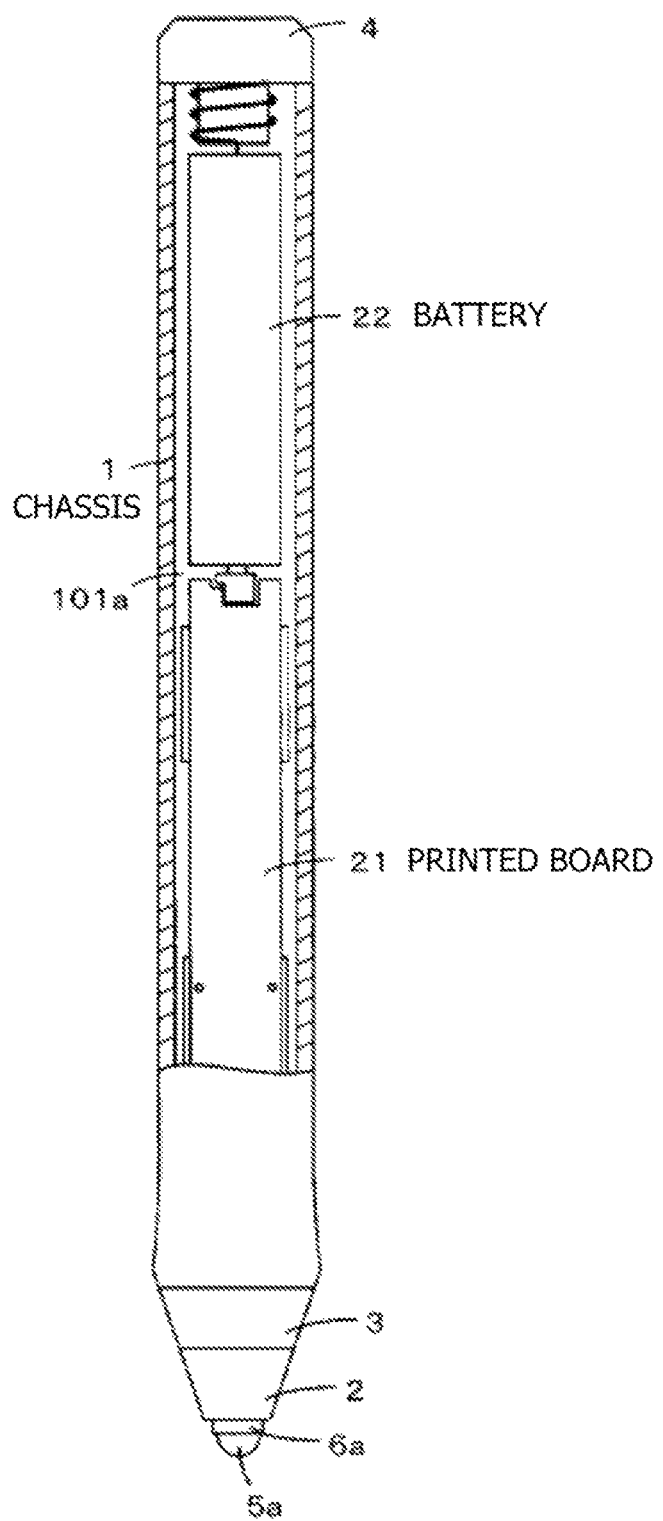
FIG. 3 is a partial sectional view of a configuration example of a position indicator according to an embodiment of this disclosure.

FIG. 3 is a diagram showing a state in which part of the tubular chassis 1 of the position indicator 100 of this embodiment is represented as a section and part of the hollow part of the chassis 1 is exposed to the outside. As shown in FIG. 3, the side opposite to the pen tip side of the chassis 1 is closed by a lid part 4 and a printed board 21 on which a signal processing circuit and so forth (not shown in FIG. 3) are disposed is housed in a hollow part 101a of the tubular chassis 1. Furthermore, a battery 22 that provides a supply voltage to the signal processing circuit and so forth is housed between the printed board 21 and the lid part 4. In this example, the lid part 4 is allowed to be removed so that the battery 22 can be replaced.

FIG. 4 is a diagram showing a circuit example disposed on the printed board 21 of the position indicator 100 of this embodiment and the electrical connection relationship among the respective components in the position indicator 100. As shown in FIG. 4, in the position indicator 100 of this embodiment, a signal processing circuit 401, an integrated circuit (IC) 402, and a wireless transmission circuit 403 (i.e., a transmitter) are provided on the printed board 21. A power supply circuit that provides a supply voltage from the voltage from the battery 22 to these signal processing circuit 401, IC 402, and wireless transmission circuit 403 is also provided on the printed board 21 although not shown in FIG. 4.

In this embodiment, the central electrode 5 is configured to be electrically connected to the input terminal of the signal processing circuit 401 and the output terminal of the signal processing circuit 401 is configured to be electrically connected to the peripheral electrode 2. In this example, the signal processing circuit 401 carries out phase inversion on an AC signal (current signal) input via the central electrode 5 and then performs boosting (multiplication) by using a transformer, for example, to intensify the signal and supply the resulting signal to the peripheral electrode 2 as a voltage signal.

Therefore, the AC signal returned from the peripheral electrode 2 of the position indicator 100 to the sensor unit 210 of the position detecting sensor 201 is a reverse-phase signal resulting from the intensification of the AC signal supplied to the transmitting conductor 213Y. Thus, the position indicator 100 functions to increase the change in the AC signal in the received signal of the receiving conductor 214X of the position detecting sensor 201. This enables the position detecting sensor 201 to detect the contact position of the position indicator 100 with high sensitivity.

In this embodiment, the chassis 1 of the position indicator 100 is formed of SUS as an electrically-conductive material and is connected to an earth conductor (not shown) formed on the printed board 21, on which the signal processing circuit 401 is provided. Therefore, the AC signal supplied to the transmitting conductors 213Y in the position detecting sensor 201 flows to the ground via the chassis 1 of the position indicator 100 and the human body of the user (see a dotted line in FIG. 4), which allows further stabilization of the signal detection operation.

As shown in FIG. 4, in this embodiment, the shield member 6 has a configuration obtained by covering a tubular body 61 having a distal opening 61c and composed of an electrically-conductive material by an insulating layer 62 across its whole surface including the outer wall surface and inner wall surface. However, as described later, part of the shield member 6 is formed as a part at which the insulating layer 62 is not formed so that an outer wall surface 61a of the tubular body 61 of the electrically-conductive material may be exposed at this part. This part at which the outer wall surface 61a is exposed is used as a terminal part for an electrical connection to the earth conductor on the printed board 21. Electrical insulation between the central electrode 5 and the peripheral electrode 2 is realized by the insulating layer 62 of the shield member 6. In addition, a capacitive shield between the central electrode 5 and the peripheral electrode 2 is realized by the connection of the tubular body 61 of the electrically-conductive material in the shield member 6 to the earth conductor.

Furthermore, in this embodiment, a writing pressure detecting unit 10 that detects a pressure applied to the central electrode 5 forming the core body, i.e., writing pressure, is provided in the hollow part 101a of the chassis 1 of the position indicator 100 as shown in FIG. 4. As described later, this writing pressure detecting unit 10 has a configuration based on a variable-capacitance capacitor Cv that receives the writing pressure applied to the central electrode 5 via a pressure transmitting member 7 and changes a capacitance of the variable-capacitance capacitor Cv. As shown in FIG. 4, the central electrode 5 and the pressure transmitting member 7 are joined to each other and are housed in a slidable state in the hollow part of the tubular body 61 of the shield member 6.

Both electrodes of the variable-capacitance capacitor Cv formed of the writing pressure detecting unit 10 are connected to the IC 402. The IC 402 calculates the writing pressure applied to the position indicator 100 from the value of the capacitance of the variable-capacitance capacitor Cv. Then, the IC 402 converts the calculated writing pressure to transmission data and transmits it to the position detecting sensor 201 via the wireless transmission circuit 403. The wireless transmission circuit 403 is formed of, e.g., a near-distance wireless transmission measure of the Bluetooth (registered trademark) standard or the like. The position detecting sensor 201 receives and decodes this transmission data of the writing pressure to detect the writing pressure applied to the position indicator 100.

<Detailed Configuration Example of Major Part of Position Indicator 100>

Figure 5:
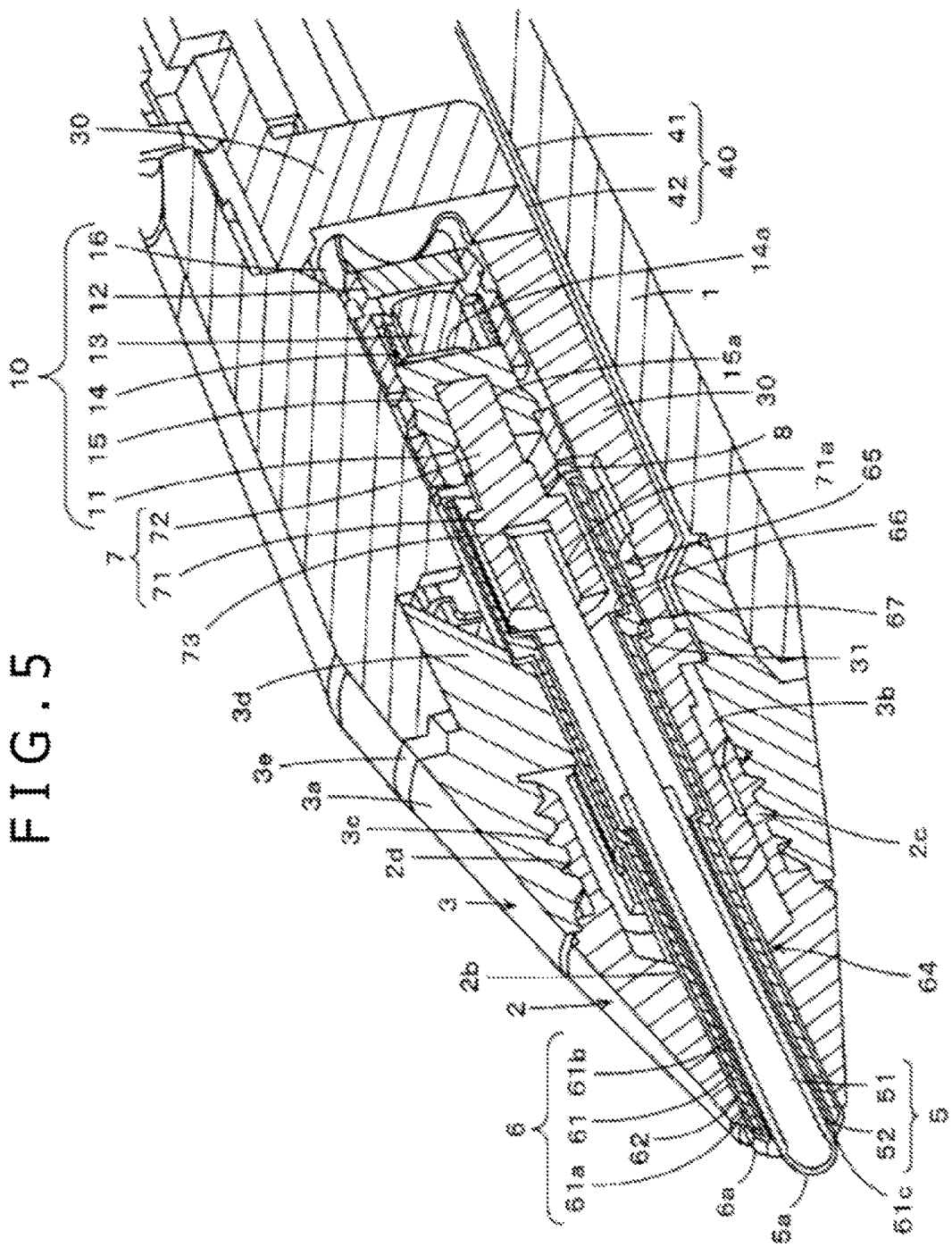
FIG. 5 is a partial sectional view of a position indicator according to an embodiment of this disclosure.

FIG. 5 is a sectional view showing a detailed configuration example of the pen tip side of the position indicator 100 of this embodiment and corresponds to the part that is not shown as the section in FIG. 3. For easier understanding, FIG. 5 shows a state obtained by cutting a perspective view of the pen tip side of the position indicator 100 by a plane including the central axis position of the tubular body forming the chassis 1.

Figure 6:
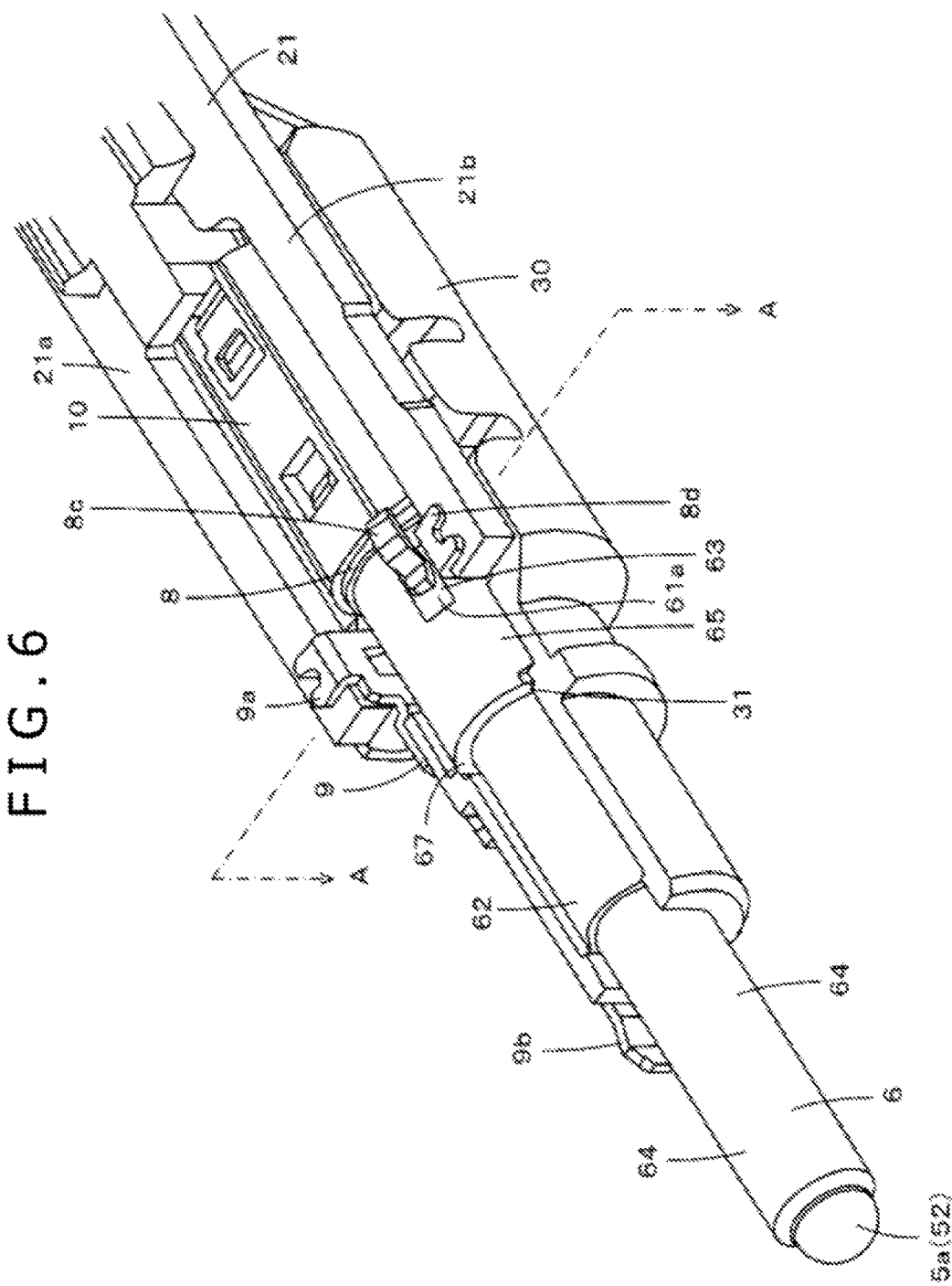
FIG. 6 is a perspective view of exemplary components housed inside a chassis of a position indicator according to an embodiment of this disclosure in an assembled state.
Figure 7:
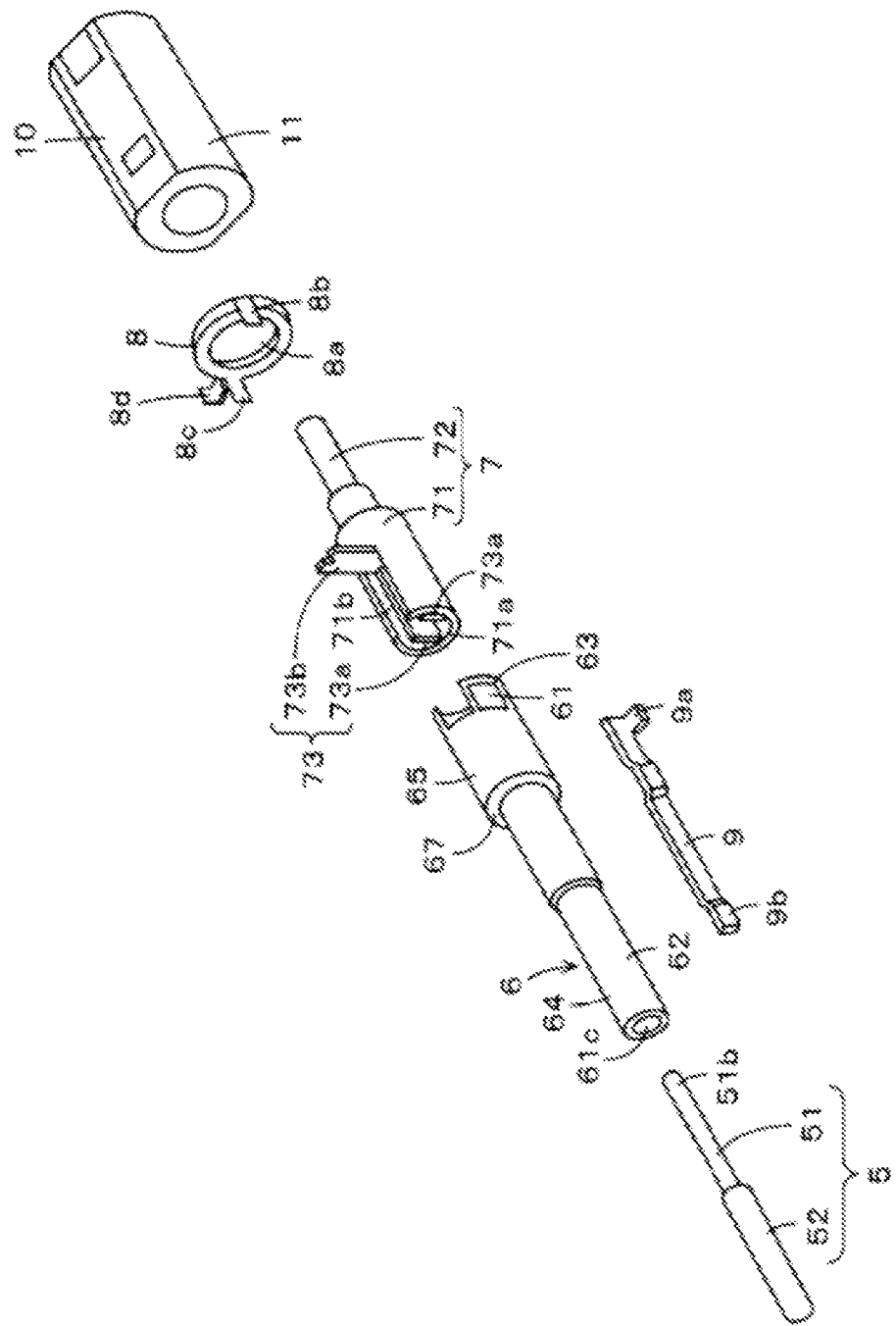
FIG. 7 is an exploded perspective view of the components shown in FIG. 6.
Figure 8:
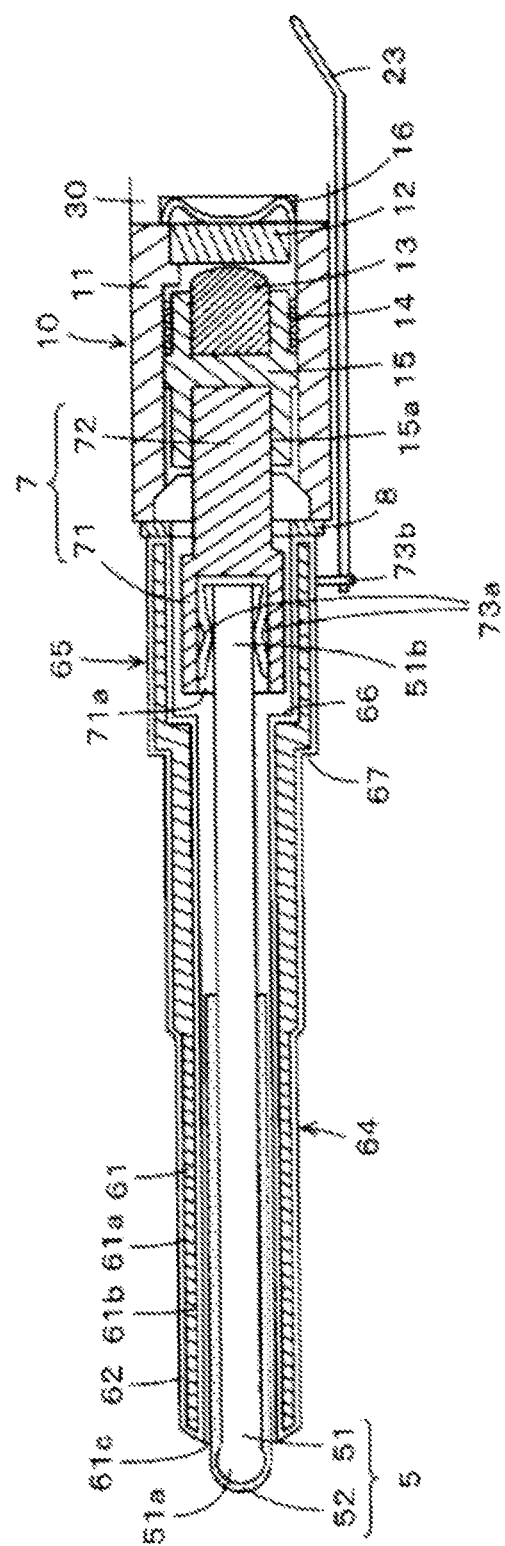
FIG. 8 is a diagram showing the components shown in FIG. 7 in an assembled state.
Figure 9:
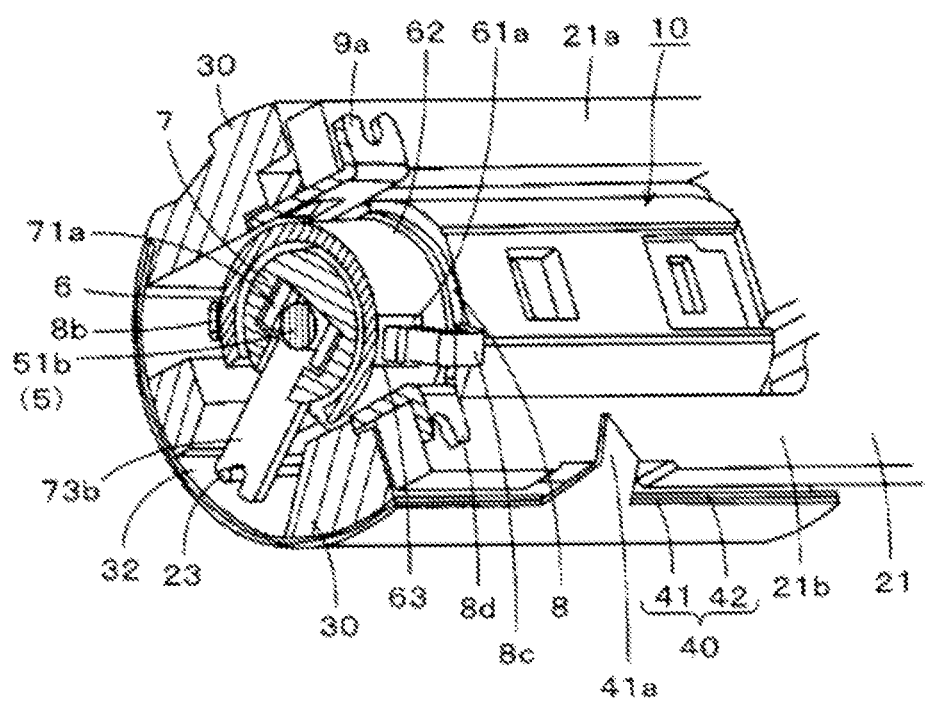
FIG. 9 is a sectional view along line A-A in FIG. 6.
Figure 10:
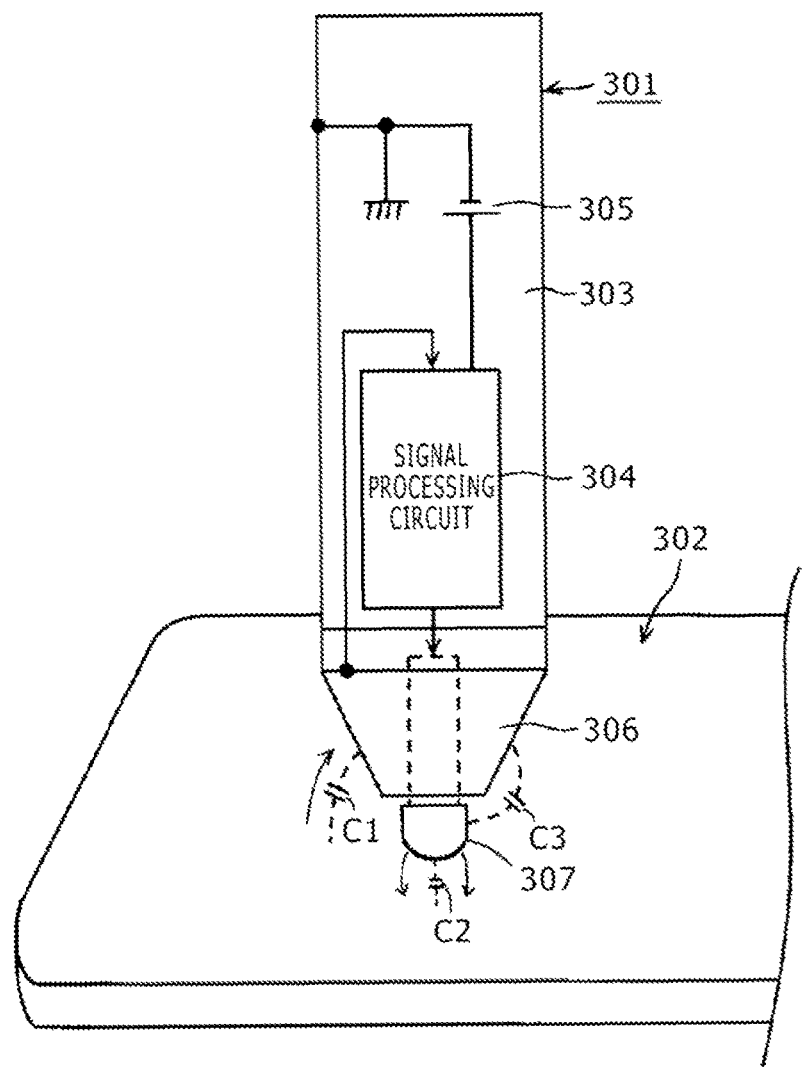
FIG. 10 is a circuit diagram of a conventional position indicator.
Figure 11:
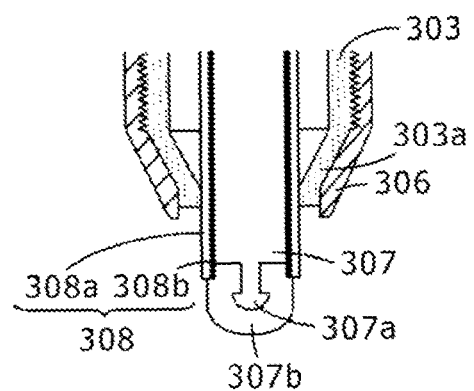
FIG. 11 is a diagram showing part of a conventional position indicator.

FIG. 6 is a diagram showing a component group housed in the hollow part of the tubular chassis 1 in an assembled state. FIG. 7 is an exploded perspective view of major components in the component group in this FIG. 6. FIG. 8 is a diagram showing a state in which the major components shown in FIG. 7 are assembled and FIG. 9 is a sectional view along line A-A in FIG. 6.

As shown in FIG. 5, the insulating sleeve 3 is formed into a truncated cone shape that has an outer circumferential surface 3a formed into a tapered shape to gradually become thinner toward the pen tip side and has a through-hole 3b through which the shield member 6 to shield the central electrode 5 is inserted. The diameter of the pen tip side of this through-hole 3b is set slightly larger for joining to the peripheral electrode 2. In addition, a screw part 3c for screwing the peripheral electrode 2 is formed in the inner wall surface of the pen tip side of the through-hole 3b. Furthermore, the insulating sleeve 3 has a protruding part 3d that protrudes from the end surface of the larger-diameter part on the side opposite to the pen tip side in the axial center direction. This protruding part 3d is press-fitted into the opening end part of the pen tip side of the tubular chassis 1 and thereby the insulating sleeve 3 is fixed to the chassis 1. Symbol 3e denotes a decorative ring and it is clamped and fixed between the insulating sleeve 3 and the chassis 1 when the insulating sleeve 3 is press-fitted and fixed to the chassis 1.

The peripheral electrode 2 is composed of SUS as an example of an electrically-conductive material and is formed into a truncated cone shape that has an outer circumferential surface formed into a tapered shape continuously with the outer circumferential surface 3a of the insulating sleeve 3 and has a through-hole 2b through which the shield member 6 in which the central electrode 5 is housed is inserted. Furthermore, a protruding part 2c that protrudes in the axial center direction is provided on the side opposite to the pen tip side of the peripheral electrode 2. On this protruding part 2c of the peripheral electrode 2, a screw part 2d screwed to the screw part 3c of the insulating sleeve 3 is formed.

The through-hole 2b of the peripheral electrode 2 is formed such that the diameter of its part on the pen tip side is the minimum inner diameter. As this minimum inner diameter, a diameter slightly larger than the outer diameter of the part of the shield member 6 on the pen tip side is selected. The inner diameter of the through-hole 2b of the peripheral electrode 2 on the side of the screw part 2d is set larger than the minimum inner diameter. As described later, a terminal piece 9 (see FIG. 6) for an electrical connection between the signal processing circuit disposed on the printed board 21 and the peripheral electrode 2 is allowed to be located in the space between this larger-inner-diameter part of the through-hole 2b and the shield member 6.

As shown in FIGS. 5, 7, and 8, the central electrode 5 includes a core body 51 composed of an electrically-conductive material, specifically, e.g., a metal, whose diameter is set to, e.g., 1.9 mm. Furthermore, in this embodiment, in the central electrode 5, about half of the core body 51 on the pen tip side is covered by a protective member 52 composed of an insulating material, specifically polyoxymethylene (POM) in this example. This part of the core body 51 covered by the protective member 52 becomes a state in which the peripheral electrode 2 is located around this part when being assembled as the position indicator 100. As shown in FIGS. 5 and 8, the core body 51 is formed such that its tip part 51a has a spherical shape and the protective member 52 is formed to cover the whole of this spherical tip part of the core body 51 and forms the tip part 5a of the central electrode 5. This protective member 52 has roles in preventing scratching of the indication input surface of the position detecting sensor 201 and increasing the contact area with the indication input surface. Furthermore, particularly in this embodiment, the protective member 52 has a role in strengthening insulation from the shield member 6 and the peripheral electrode 2.

In this embodiment, the tubular body 61 composed of an electrically-conductive material forming the shield member 6 is composed of alumite-processed aluminum. Furthermore, as shown in FIGS. 5 and 8, the insulating layer 62 is formed of an alumite coat formed to cover the whole surface of the tubular body 61 including the outer wall surface 61a and an inner wall surface 61b.

However, the alumite processing of the tubular body 61 is performed such that, at a terminal part 63, the insulating layer 62 is not formed and the outer wall surface 61a of the tubular body 61 composed of the electrically-conductive material is exposed as shown in FIGS. 6 and 7. The terminal part 63 of the tubular body 61 is electrically connected to the earth conductor (ground) of the printed board 21 and an electric field shield of the central electrode 5 is formed by the tubular body 61. This terminal part 63 can be formed by masking the corresponding part when alumite processing of the tubular body 61 is performed for example. Alternatively, after the alumite processing, the alumite coat at the terminal part 63 may be removed to expose the outer wall surface 61a of the tubular body 61.

In this embodiment, as described by using FIG. 4, in the hollow part of the tubular body 61 of the shield member 6, the central electrode 5 and the pressure transmitting member 7 joined to each other are housed movably in this hollow part in the axial center direction of the central electrode 5. As the pressure transmitting member 7, a member having a larger diameter than the central electrode 5 is used.

For this reason, as shown in FIGS. 5 and 8, the tubular body 61 of the shield member 6 is configured to have a smaller-diameter part 64 having such an inner diameter as to house the central electrode 5 movably in the axial center direction mainly on the pen tip side and a larger-diameter part 65 having such an inner diameter as to house the pressure transmitting member 7 movably in the axial center direction on the opposite side to the pen tip side.

As the inner diameter of the hollow part of the smaller-diameter part 64, a diameter slightly larger than the outer diameter of the central electrode 5 (diameter of the part where the protective member 52 is formed on the core body 51) is selected. Furthermore, as the inner diameter of the larger-diameter part 65, a diameter slightly larger than the maximum diameter of the pressure transmitting member is selected. Therefore, in the hollow part of the tubular body 61, a step part 66 is formed at the part at which the change from the smaller-diameter part 64 to the larger-diameter part 65 is made. Furthermore, also on the outer circumferential side surface of the tubular body 61, a step part 67 is formed at the part at which the change from the smaller-diameter part 64 to the larger-diameter part 65 is made.

The pressure transmitting member 7 is formed of an insulating material, specifically a resin in this example. As shown in FIGS. 5, 7, and 8, the pressure transmitting member 7 has a core body fitting part 71 into which an end part 51b of the core body 51 of the central electrode 5 is fitted and a protruding part 72 fitted into the writing pressure detecting unit 10. The core body fitting part 71 of the pressure transmitting member 7 is configured by forming a recess 71a into which the end part 51b of the core body 51 of the central electrode 5 is inserted in a circular columnar member. As shown in FIG. 7, at part of the side circumferential surface of this core body fitting part 71, a slit 71b obtained by notching the sidewall of the recess 71a in the axial center direction from the opening side to the bottom part is formed. As shown in FIGS. 5 and 8, the protruding part 72 of the pressure transmitting member 7 is joined to the writing pressure detecting unit 10 for transmitting a writing pressure thereto.

As shown in FIGS. 7 and 8, in the recess 71a, a terminal piece 73 for an electrical connection between the central electrode 5 and the signal processing circuit 401 of the printed board 21 is disposed. This terminal piece 73 is formed of a metal plate and, as shown in FIGS. 7 and 8, has a pair of first terminal pieces 73a that are disposed opposed to each other in a direction orthogonal to the axial center direction and are formed to extend along the axial center direction in the recess 71a and a second terminal piece 73b disposed to protrude in a direction orthogonal to the outer circumferential side surface of the core body fitting part 71 of the pressure transmitting member 7 through the slit 71b. The pair of first terminal pieces 73a are formed elastically displaceably in the direction orthogonal to the axial center direction and are disposed such that the interval thereof is the same as or somewhat smaller than the diameter of the core body 51.

The core body 51 of the central electrode 5 is joined to the pressure transmitting member 7 by insertion (press-fitting) of its end part 51b into the recess 71a of the core body fitting part 71 of the pressure transmitting member 7, and a writing pressure applied to the core body 51 is transmitted to the writing pressure detecting unit 10 to be described later via the pressure transmitting member 7. Specifically, the end part 51b of the core body 51 of the central electrode 5 is press-fitted into between the pair of first terminal pieces 73a in the recess 71a of the core body fitting part 71 against the elastic displacement force of them. Along with this, the core body 51 of the central electrode 5 is elastically clamped by the pair of terminal pieces 73a as shown in FIG. 8. Therefore, the central electrode 5 is locked to the pressure transmitting member 7 and is set to a state in which the locking to the pressure transmitting member 7 is not released unless the central electrode 5 is pulled out by a predetermined force.

The unit obtained by the joining of the central electrode 5 and the pressure transmitting member 7 in the above manner is housed movably in the axial center direction in the tubular body 61 of the shield member 6. The core body fitting part 71 of the pressure transmitting member 7 engages with the step part 66 of the hollow part of the tubular body 61 of the shield member 6, which prevents the central electrode 5 and the pressure transmitting member 7 from dropping off to the pen tip side. However, when a force is applied to pull out only the central electrode 5, the elastic clamping of the end part 51b of the core body 51 by the first terminal pieces 73a is released and the central electrode 5 can be pulled out from the pressure transmitting member 7. That is, a configuration enabling replacement of the central electrode 5 is made.

Next, the writing pressure detecting unit 10 will be described below. As the writing pressure detecting unit 10 of this example, a writing pressure detecting measure having a known configuration described in patent document, Japanese Patent Laid-Open No. 2011-186803 is used for example. The writing pressure detecting unit 10 configures a variable-capacitance capacitor whose capacitance changes according to the writing pressure applied to the central electrode 5.

As shown in FIGS. 5 and 8, the writing pressure detecting unit 10 of this example is formed by housing plural components, a dielectric 12, an electrically-conductive member 13, an elastic member 14, a holding member 15, and a terminal member 16, in a housing member 11 composed of an insulating material, specifically, e.g., a resin. The terminal member 16 forms a first electrode of the variable-capacitance capacitor configuring the writing pressure detecting unit 10. Furthermore, the electrically-conductive member 13 and the elastic member 14 are electrically connected to each other and form a second electrode of the variable-capacitance capacitor.

The housing member 11 is formed of a tubular body having a hollow part and has a configuration to arrange the holding member 15, the elastic member 14, the electrically-conductive member 13, the dielectric 12, and the terminal member 16 in the axial center direction and house them in the hollow part. The dielectric 12 and the terminal member 16 are fixed so as not to move in the axial center direction relative to the housing member 11.

The holding member 15 is provided movably in the axial center direction relative to the housing member 11. At the end surface of this holding member 15 on the pen tip side, a recess 15a into which the protruding part 72 of the pressure transmitting member 7 is fitted is made. By the press-fitting of the protruding part 72 of the pressure transmitting member 7 into this recess 15a of the holding member 15, the whole of the central electrode 5, the pressure transmitting member 7, and the holding member 15 is allowed to move in the axial center direction according to the writing pressure applied to the central electrode 5.

At the end surface of the holding member 15 on the opposite side to the end surface at which the recess 15a is formed, the electrically-conductive member 13 is joined and held. This electrically-conductive member 13 is formed of a member that has electrical conductivity and is elastically deformable, specifically, e.g., an elastic member such as a silicone conductive rubber or a pressure conductive rubber. The elastic member 14 is formed of, e.g., a coil spring having electrical conductivity. The elastic member 14 has a winding part having elasticity and a terminal piece (not shown) at one end part of this winding part, and has a connecting part 14a at the other end part of the winding part.

The elastic member 14 is combined to surround the electrically-conductive member 13 held by the holding member 15 by its winding part. At this time, an end surface of the electrically-conductive member 13 makes contact with the connecting part 14a of the elastic member 14 having electrical conductivity and becomes in a state of being electrically connected thereto. The terminal piece (not shown) at the end part on the opposite side to the connecting part 14a of the elastic member 14 is configured to be soldered to an electrically-conductive pattern of the printed board 21.

The terminal member 16 is configured to be electrically connected to an electrically-conductive pattern of the printed board 21 (this connection is not shown).

In the writing pressure detecting unit 10 configured as above, when a writing pressure is applied to the central electrode 5, this writing pressure is transmitted to the holding member 15 of the writing pressure detecting unit 10 via the pressure transmitting member 7 and the holding member 15 moves the electrically-conductive member 13 toward the dielectric 12 according to the applied writing pressure. Along with this, an end part of the electrically-conductive member 13 abuts against the dielectric 12 and the contact area with the electrically-conductive member 13 changes according to the applied writing pressure. Thus, the capacitance of the variable-capacitance capacitor formed between the first electrode and the second electrode is changed according to the applied writing pressure.

Then, as described above, the position indicator 100 of this embodiment detects, by the IC 402, the writing pressure applied to the position indicator 100 from the capacitance of the variable-capacitance capacitor configuring the writing pressure detecting unit 10 and transmits information on the detected writing pressure through the wireless transmission circuit 403.

[Connection Between Central Electrode 5 and Input Terminal of Signal Processing Circuit 401]

The terminal piece 73 disposed in the pressure transmitting member 7 is a member for electrically connecting the central electrode 5 to the signal processing circuit disposed on the printed board 21. The end part 51b of the core body 51 of the central electrode 5 elastically makes contact with the first terminal pieces 73a and thereby the central electrode 5 is electrically connected to the terminal piece 73.

The length of the second terminal piece 73b of the terminal piece 73 is set to such a length that its tip protrudes to the outside of the housing member 11 of the writing pressure detecting unit 10 as shown in FIGS. 7 and 8. Furthermore, as shown in FIGS. 7 and 9, a notch having a V-shape or a U-shape is made at the tip of this second terminal piece 73b of the terminal piece 73.

To this V-shaped or U-shaped notch at the tip of the second terminal piece 73b, one end of a connecting line 23 formed of, e.g., a copper line is soldered as shown in FIGS. 8 and 9. The other end of this connecting line 23 is connected by soldering or the like to a conductor pattern to which an input terminal of the signal processing circuit 401 provided on the printed board 21 is connected, although not shown in the diagram.

Because the second terminal piece 73b of the terminal piece 73 housed in the pressure transmitting member 7 is configured to protrude to the outside of the housing member 11 of the writing pressure detecting unit 10, the connecting line 23 is disposed at such a position as to connect the second terminal piece 73b of the terminal piece 73 to the printed board 21 while bypassing the whole of the writing pressure detecting unit 10 interposed between the printed board 21 and the pressure transmitting member 7.

[Connection Between Tubular Body 61 of Shield Member 6 and Earth Conductor]

Next, a configuration for the connection between the tubular body 61 of the shield member 6 and the earth conductor of the printed board 21 will be described. Specifically, also as described above, the tubular body 61 of the electrically-conductive material configuring the shield member 6 needs to be electrically connected to the earth conductor of the printed board 21. The earth conductor of the printed board 21 is electrically connected to the chassis 1. Therefore, when a user holds the chassis and operates the position indicator 100, the earth conductor is connected to the earth (ground) via the human body and provides a favorable shield effect.

As shown in FIGS. 5, 6, and 9, in this embodiment, the shield member 6 and the writing pressure detecting unit 10 are disposed in a holder 30. This holder 30 has a so-called dugout-like shape like a shape obtained by cutting the tubular body 61 by a plane along the axial center direction thereof. The part of the holder 30 to house the shield member 6 has a recess shape corresponding to the outer shape of the shield member 6. Furthermore, the part to house the writing pressure detecting unit 10 has a recess shape corresponding to the outer shape of the housing member 11 of the writing pressure detecting unit.

As shown in FIGS. 5 and 6, in this example, the step part 67 formed on the side of the outer wall surface 61a of the tubular body 61 of the shield member 6 engages with a step part 31 formed in the holder 30 and thereby the shield member 6 is prevented from moving in the axial center direction in the holder 30. Furthermore, the writing pressure detecting unit 10 is prevented from moving in the axial center direction by the combination of the recess corresponding to the outer shape of the writing pressure detecting unit 10 and the preventing the shield member 6 from moving in the axial center direction. Furthermore, as shown in FIG. 5, the holder 30 abuts against the insulating sleeve 3 to be restricted from moving toward the opening side of the chassis 1 on the pen tip side. In addition, the printed board 21 joined and fixed to this holder 30 is fixed by the lid part 4 with the intermediary of the housing part of the battery 22 and thereby the holder 30 is also restricted from moving toward the lid part 4.

As shown in FIG. 6, in this example, at one end of the printed board 21 in the longitudinal direction, arm parts 21a and 21b extending along the longitudinal direction of the printed board 21 are formed from both end parts of the printed board 21 in a direction orthogonal to the longitudinal direction. The arm parts 21a and 21b of this printed board 21 are joined to the opening end surface of the part at which the writing pressure detecting unit 10 is housed in the holder 30 and thereby the printed board 21 is fixed to the holder 30.

In this case, although not shown in the diagram, a conductor pattern to connect to the output terminal of the signal processing circuit 401 disposed on the printed board 21 is formed on the arm part 21a and a conductor pattern to connect to the earth conductor of the printed board 21 is formed on the arm part 21b.

In this embodiment, as shown in FIGS. 5, 6, 8, and 9, a ring terminal piece 8 shown in FIG. 7 is provided between the pressure transmitting member 7 and the housing member 11 of the writing pressure detecting unit 10. In this case, the ring terminal piece 8 is formed to have substantially the same size and shape as an end surface of the tubular housing member 11. Furthermore, the protruding part 72 of the pressure transmitting member 7 is inserted through a ring space 8a of the ring terminal piece 8 and the ring terminal piece 8 is clamped by a step part formed between the core body fitting part 71 and the protruding part 72 and the end surface of the housing member 11 of the writing pressure detecting unit 10.

In this ring terminal piece 8, connection protrusions 8b and 8c are formed at positions corresponding to the terminal parts 63, at which the outer wall surface 61a of the tubular body 61 provided in the shield member 6 is exposed. The terminal parts 63 of the tubular body 61 are formed at two positions that are opposed to each other and are separate by an angular interval of 180 degrees. The connection protrusions 8b and 8c are formed corresponding to these two terminal parts 63. Furthermore, in the ring terminal piece 8, a connection protrusion 8d to connect to the electrically-conductive pattern connected to the earth conductor formed on the arm part 21b of the printed board 21 is also formed.

As shown in FIGS. 6 and 9, the connection protrusions 8b and 8c of the ring terminal piece 8 are each soldered to the outer wall surface 61a of the tubular body 61 exposed at the terminal part 63 of the shield member 6 in a state of being brought into contact with the outer wall surface 61a. Furthermore, as shown in FIGS. 6 and 9, the connection protrusion 8d of the ring terminal piece 8 is soldered in a state of being connected to the earth conductor formed on the arm part 21b of the printed board 21. By the above configuration, the tubular body 61 composed of an electrically-conductive material in the shield member 6 is connected to the earth conductor of the printed board 21 and an electric field shield is realized.

[Connection Between Peripheral Electrode 2 and Output Terminal of Signal Processing Circuit 401]

Next, a configuration for an electrical connection between the peripheral electrode 2 and the output terminal of the signal processing circuit 401 of the printed board 21 will be described.

Specifically, in this embodiment, as shown in FIG. 7, the terminal piece 9 for the peripheral electrode 2 is prepared by, e.g., a metal plate having elasticity as a component having a shape allowing elastic displacement in its plate thickness direction. On one end side of this terminal piece 9 for the peripheral electrode 2 in the longitudinal direction, a connection protrusion 9*a* connected to the conductor pattern connected to the output terminal of the signal processing circuit 401 formed on the arm part 21*a* of the printed board 21 is formed. On the other hand, a connection end part 9*b* that elastically makes contact with the inner wall surface of the peripheral electrode 2 is formed on the other end side of this terminal piece 9 for the peripheral electrode 2 in the longitudinal direction.

This terminal piece 9 for the peripheral electrode 2 is fixed to the holder 30 by fitting of the side of the connection protrusion 9*a* into a pocket part (not shown) formed in the holder 30. As shown in FIG. 6, this terminal piece 9 for the peripheral electrode 2 is fixed along the outer wall surface of the housing recess for the shield member 6 in the holder 30, with its longitudinal direction set to the same direction as the axial center direction. Therefore, when the peripheral electrode 2 is screwed to the insulating sleeve 3, the inner wall surface of the peripheral electrode 2 elastically makes contact with the connection end part 9*b* of the terminal piece 9 and is electrically connected thereto.

[Isolation Between Connecting Line 23 and Terminal Piece 9 for Peripheral Electrode 2]

In this embodiment, the connecting line 23 for the electrical connection between the central electrode 5 and the input terminal of the signal processing circuit 401 of the printed board 21 and the terminal piece 9 for the electrical connection between the peripheral electrode 2 and the output terminal of the signal processing circuit of the printed board 21 form a signal line for a received signal and a signal line for a transmission signal, respectively. The connecting line 23 and the terminal piece 9 are both disposed along the axial center direction in such a manner as to straddle the writing pressure detecting unit 10. For this reason, there is a fear that the transmission signal and the received signal interfere with each other and the position indicator 100 becomes incapable of stably operating.

In view of this point, in this embodiment, the occurrence of the interference between the transmission signal and the received signal is prevented as described below.

First, in the hollow part of the chassis 1 of the position indicator 100, the placement position of the connecting line 23 as the signal line of the received signal and the placement position of the terminal piece 9 forming the signal line of the transmission signal are set at positions separate from each other by 180 degrees, which are positions separate from each other at the highest degree, in the circumferential direction of the hollow part of the chassis 1.

Second, in this embodiment, the connecting line 23 as the signal line of the received signal is isolated from the terminal piece 9 and is shielded (electromagnetically shielded). Specifically, as shown in FIGS. 5 and 9, the connecting line 23 is covered by a copper tape 40 configured by forming an insulating coating layer 42 on one surface of a rolled copper foil 41. At this time, the copper tape 40 is disposed along the writing pressure detecting unit 10, with the insulating coating layer 42 located on the side of the connecting line 23. As shown in FIG. 9, in this embodiment, the connecting line 23 is disposed in a groove 32 formed at part of the circumferential side surface of the holder 30 in such a manner as to bypass the writing pressure detecting unit 10 housed and held in the holder 30.

Furthermore, in this embodiment, one end 41*a* of the rolled copper foil 41 is soldered to the arm part 21*b* of the printed board 21 fixed to the holder 30 and the copper tape 40 is connected to the earth conductor formed on the arm part 21*b*. In this case, the length of the copper tape 40 in the circumferential direction is set to such a length as to cover an angular range of about 180 degrees from the arm part 21*b* of the printed board 21 to a position immediately before the placement position of the terminal piece 9 as shown in FIG. 9. Furthermore, the range covered by the copper tape 40 in the axial center direction includes the whole of the housing part for the writing pressure detecting unit 10 in the holder 30 in the axial center direction and reaches the base part of the arm part 21*b* of the printed board 21.

By the above configuration, the signal line of the received signal by the connecting line 23 to connect the central electrode 5 and the input terminal of the signal processing circuit 401 and the signal line of the transmission signal by the terminal piece 9 to connect the peripheral electrode 2 and the output terminal of the signal processing circuit 401 are electrically isolated from each other by the shield based on the copper tape 40, so that the interference between the transmission signal and the received signal is suppressed.

[Effects of Embodiment]

In the above manner, in the position indicator 100 of this embodiment, in the shield member 6, the insulating layer 62 formed of an alumite coat is formed across the whole of the tubular body 61 including the outer wall surface 61*a* and the inner wall surface 61*b* by performing alumite processing on the whole of the tubular body 61 (excluding the terminal part 63) composed of aluminum. Furthermore, the aluminum as an electrically-conductive material is connected to the earth conductor of the printed board 21 at the terminal part 63 and thereby an electric field shield is realized.

Therefore, according to this embodiment, the insulation and shield between the central electrode 5 and the peripheral electrode 2 can be realized by only the shield member 6 and the thickness of the pen tip side can be reduced. In addition, the central electrode 5 can be configured to be covered by the whole of the shield member 6 and thus the thickness of the central electrode 5 can be further reduced.

Moreover, in this embodiment, the protective member 52 is provided at the part surrounded by the peripheral electrode 2 in the core body 51 forming the central electrode 5 and thus the insulation between the central electrode 5 and the peripheral electrode 2 is further strengthened.

Furthermore, in this embodiment, the central electrode 5 itself is not used to transmit a pressure to the writing pressure detecting unit 10 and the pressure is transmitted via the pressure transmitting member 7. Thus, although the thickness of the central electrode 5 is reduced, an effect that a writing pressure can be surely transmitted to the writing pressure detecting unit 10 is provided by the pressure transmitting member 7.

In addition, according to this embodiment, the central electrode 5 is allowed to be inserted and removed into and from the pressure transmitting member 7 and thus there is also an effect that the central electrode 5 can be replaced.

Moreover, in this embodiment, the signal line of the received signal by the connecting line 23 to connect the central electrode 5 and the input terminal of the signal processing circuit 401 and the signal line of the transmission signal by the terminal piece 9 to connect the peripheral electrode 2 and the output terminal of the signal processing circuit 401 are disposed in the hollow part of the chassis 1. However, the connecting line 23 is shielded by the copper tape 40, which provides an effect that the interference between the transmission signal and the received signal is suppressed.

[Other Embodiments or Modification Examples]

In the above-described embodiment, the central electrode 5 is used as a receiving electrode for a signal from the position detecting sensor and the peripheral electrode is used as a transmitting electrode to transmit a signal to the position detecting sensor. However, as described also at the beginning, it is also possible to make a configuration to use the central electrode as the transmitting electrode and use the peripheral electrode as the receiving electrode.

In the above-described embodiment, in the shield member 6, the insulating layer 62 is formed to cover the whole surface of the tubular body 61 composed of an electrically-conductive material except the terminal part for an electrical connection. However, because it is enough that insulation between the peripheral electrode 2 and the central electrode 5 can be ensured, it suffices for the insulating layer 62 on the tubular body 61 of the shield member 6 to be formed at least in a region corresponding to the region in which the peripheral electrode 2 surrounds the central electrode 5.

Similarly, it also suffices for the protective member 52, which is formed to cover the tip part side of the core body 51 of the central electrode 5 and is composed of an insulating material, to be formed at least in a region range corresponding to the region in which the peripheral electrode 2 surrounds the central electrode 5.

Furthermore, in the above-described embodiment, in the shield member 6, the tubular body 61 is formed by aluminum and the insulating layer 62 is formed by performing alumite processing. However, the shield member 6 is not limited to this configuration and may be so configured that the whole of the tubular body 61 of an electrically-conductive material is covered by an insulating layer except the terminal part 63.

Moreover, in the above-described embodiment, in the writing pressure detecting unit 10, the variable-capacitance capacitor whose capacitance changes according to the writing pressure is used by interposing a dielectric between the first electrode and the second electrode and allowing one of the first electrode and the second electrode to move in the axial center direction according to the writing pressure. However, the writing pressure detecting unit 10 is not limited to this configuration. For example, it is also possible to configure the writing pressure detecting unit 10 by using a semiconductor element that allows capacitance to change according to the writing pressure like one disclosed in Japanese Patent Laid-Open No. 2013-161307. Furthermore, the writing pressure detecting unit may be configured by using a structure or an element that allows not capacitance but an inductance value or a resistance value to change according to the writing pressure.

It is to be noted that the embodiment of the present disclosure is not limited to the foregoing embodiments, and that various changes can be made without departing from the spirit of the present disclosure.

What is claimed is:

1. A position indicator that indicates a position to a position detecting sensor, the position indicator including a first electrode and a second electrode, the first electrode, in operation, receiving a first alternating current signal from the position detecting sensor and the second electrode, in operation, transmitting a second alternating current signal to the position detecting sensor, the position indicator comprising:
a pen-shaped tubular chassis having an opening at a distal end in an axial center direction;
a central electrode that is provided in the chassis such that a distal end protrudes outside of the chassis from the opening of the chassis, and that is formed of a bar-shaped electrically-conductive member forming a first one of the first electrode and the second electrode;
a peripheral electrode that surrounds the central electrode adjacent the opening of the chassis and that is formed of an electrically-conductive member forming a second one of the first electrode and the second electrode;
a shield member that is provided in the chassis between the central electrode and the peripheral electrode, that includes a tubular part that is formed of an electrically-conductive member, and that has a hollow part which houses the central electrode to be moveable in the axial center direction, wherein the shield member includes insulating layers formed on an inner wall surface and an outer wall surface of the tubular part corresponding to a part of the central electrode that is surrounded by the peripheral electrode, and the tubular part is electrically connected to a ground conductor;
a writing pressure detector that is provided in the chassis and that, in operation, detects a pressure applied to a part of the central electrode protruding from the opening of the chassis as a writing pressure, wherein a proximal end of the central electrode is coupled to the writing pressure detector;
circuitry that, in operation, receives the first alternating current signal received by the first electrode from the position detecting sensor and supplies the second alternating current signal to the second electrode; and
a terminal piece that electrically connects the central electrode to the circuitry and that partly overlaps with the writing pressure detector, wherein overlapping parts of the terminal piece and the writing pressure detector are electrically isolated from an electrical connecting line between the peripheral electrode and the circuitry,
wherein the shield member, the writing pressure detector, and the circuitry are disposed in the chassis in the axial center direction in an order of the shield member, the writing pressure detector, and the circuitry from the opening of the chassis.

2. The position indicator according to claim 1,
wherein the tubular part of the shield member is composed of aluminum and the insulating layers are formed on the inner wall surface and the outer wall surface by alumite processing.

3. The position indicator according to claim 1,
wherein at least the distal end of the central electrode protruding outside of the chassis is covered by a non-electrically-conductive member having a frictional resistance that is lower than a frictional resistance of the bar-shaped electrically conductive member forming the central electrode, and the central electrode has a part at which the bar-shaped electrically conductive member is exposed near a proximal end.

4. The position indicator according to claim 1,
wherein the writing pressure detector includes a variable-capacitance capacitor that includes two electrodes opposed to each other in the axial center direction of the chassis with a dielectric interposed between the two electrodes, and a capacitance between the two electrodes changes according to the pressure applied to the part of the central electrode protruding from the opening of the chassis.

5. The position indicator according to claim 1, further comprising:
a pressure transmitting member coupled to the proximal end of the central electrode, the pressure transmitting member, in operation, transmits the pressure applied to the part of the central electrode protruding from the opening of the chassis to the writing pressure detector,
wherein the pressure transmitting member includes the terminal piece that electrically connects the circuitry to a part at which the electrically-conductive member of the central electrode is exposed near the proximal end of the central electrode.

6. The position indicator according to claim 5,
wherein the pressure transmitting member is housed movably in the hollow part of the shield member.

7. The position indicator according to claim 1,
wherein the circuitry forms a signal having predetermined correlation with the first alternating current signal received through the first electrode and transmits the signal having the predetermined correlation as the second alternating current signal transmitted through the second electrode.

8. The position indicator according to claim 1, further comprising:
a terminal member that is disposed between the shield member and the writing pressure detector and that electrically connects the tubular part of the shield member to a ground conductor of the circuitry.

9. The position indicator according to claim 1, further comprising:
a printed board disposed in the chassis, wherein the circuitry is disposed on the printed board; and
a holding part disposed in the chassis and composed of an insulating material,
wherein the shield member and the writing pressure detector are disposed in the holding part and the holding part is fixed to the printed board.

10. The position indicator according to claim 9, further comprising:
a plate-shaped terminal piece formed of an electrically-conductive member having a distal end and a proximal end, wherein the distal end of the plate-shaped terminal piece is fixed to the holding part and is electrically connected to the circuitry on the printed board, and the proximal end of the plate-shaped terminal piece is elastically displaceable in a direction intersecting the axial center direction and
is electrically connected to the peripheral electrode.

11. The position indicator according to claim 1, further comprising
a transmitter that, in operation, transmits data corresponding to the writing pressure detected by the writing pressure detector to a position detecting device provided in the position detecting sensor.

* * * * *